Nov. 25, 1958     R. K. MacGILLIVRAY     2,861,684
DUMPING TROUGH FOR DOUBLE CYLINDER GRAIN SEPARATOR
Filed April 2, 1956     2 Sheets-Sheet 1
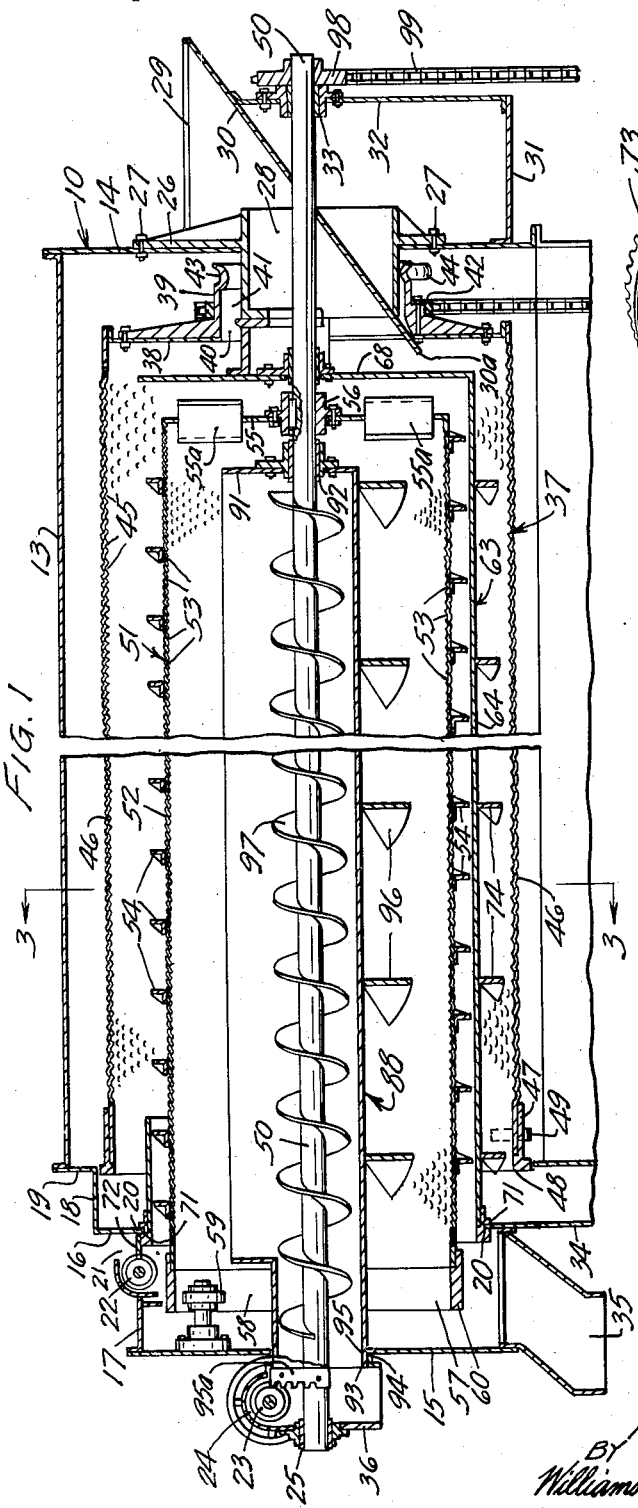
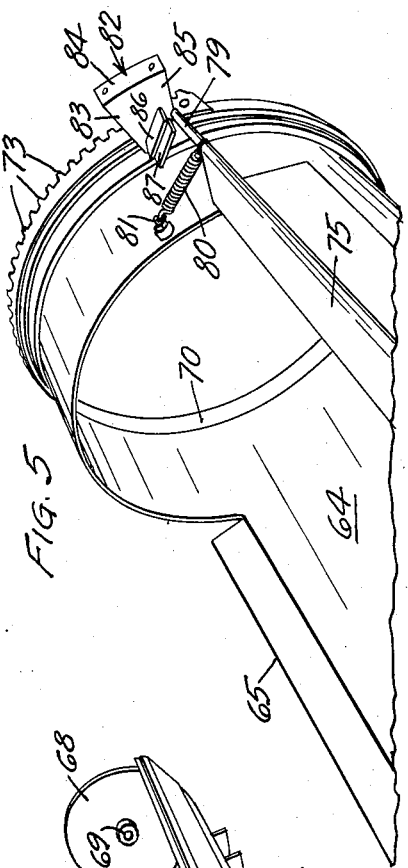
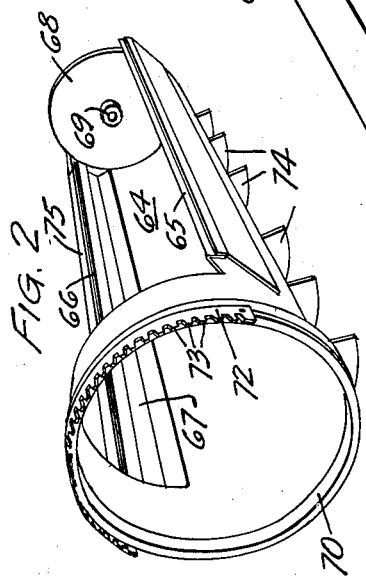
INVENTOR
ROBERT K. MACGILLIVRAY
BY
Williamson, Schroeder, Adams & Meyers
ATTORNEYS Nov. 25, 1958   R. K. MacGILLIVRAY   2,861,684
DUMPING TROUGH FOR DOUBLE CYLINDER GRAIN SEPARATOR Filed April 2, 1956   2 Sheets-Sheet 2

INVENTOR
ROBERT K. MacGILLIVRAY
BY
Williamson, Schroeder,
Adams & Mayers
ATTORNEYS

United States Patent Office 2,861,684
Patented Nov. 25, 1958

2,861,684

DUMPING TROUGH FOR DOUBLE CYLINDER GRAIN SEPARATOR

Robert K. MacGillivray, Hopkins, Minn., assignor to Superior Separator Company, Hopkins, Minn., a corporation of Delaware Application April 2, 1956, Serial No. 575,378

7 Claims. (Cl. 209—95)

This invention relates to apparatus for cleaning and separating grain, and more particularly to novel outer trough construction in a double cylinder grain separator.

The double cylinder type of grain separator and cleaner has become well established in the art. The conventional double cylinder equipment comprises an outer and an inner rotatable cylinder which are eccentrically positioned so that the spacing between them is greater at the lower area. Since the grain tends to accumulate, and to climb along the leading area inside the outer cylinder, the eccentricity is so selected as to provide greater clearance along this area as well. Between the outer and inner cylinders is a stationary outer trough which is concentric with the inner cylinder and has an outwardly flaring grading or divider plate which lies in close clearance with the inside area of the outer cylinder. Individual grains of desired size and smaller are caught in a multiplicity of pockets or indents formed on the inner surface of the outer cylinder and these grains are carried above the divider plate of the trough from which they finally drop down during rotation of the cylinder and are caught in the stationary trough. The inner cylinder similarly separates the undersized grains and permits discharge of the cleaned product. The undersized grains and other particles are transferred to the inner trough from which they are also discharged to a separate spout.

In some instances, the stationary outer trough is oscillably adjustable so that the divider plate may be raised or lowered slightly to effect sharper separation of grain particles. The continued oscillation of the outer trough is prevented because of the restricted space created near the upper portions of the cylinders in their eccentric relation. The grader or divider plate projects to close clearance even at a wider spacing and, hence, will strike or become wedged between the cylinders if it is attempted to invert the trough. It has, therefore, become the practice to provide a removable bottom plate on the outer trough whenever the grain separator is used for a different product having a different size or shape characteristic, and the outer trough must be cleaned out by laboriously opening the bottom, or the separator may be run for a while discarding the new cleaned product until it has swept out the old. The latter practice, of course, is wasteful of time and product and is to be avoided. Within the smaller eccentric cylinder is the inner trough mentioned above which operates in a similar manner to that described in connection with the outer trough. The inner trough, however, can be concentric with the inner cylinder and, therefore, permits not only oscillable adjustment, but also actual inversion for dumping out undersized waste particles at the end of a production run.

It is within the contemplation of this invention, and an important object thereof, to provide a double cylinder grain separator having improved means for rapidly adjusting and cleaning out the working parts thereof.

It is another object of the invention to provide an outer trough in separating apparatus of the class described which will have high efficiency and yet be capable of inversion for complete dumping of its contents.

It is a still further object of the invention to provide an outer trough which will safely conform to clearances within the restricted space between cylinders when inverted for dumping, and which will automatically return to operable condition when swung back to its normal upright position.

These and other objects and advantages of the invention will more fully appear from the following description, made in connection with the accompanying drawings, wherein like reference characters refer to the same parts throughout the several views and in which:

Figure 1 is a longitudinal vertical section of a double cylinder, double trough-type of grain separator utilizing my special outer trough construction, intermediate portions of the view being cut away;

Figure 2 is a perspective view of my outer trough alone and viewed from the discharge end;

Figure 5 is an enlarged fragment in perspective of the cooperating cam means and with the grading plate partially pivoted to folded relation with respect to the outer trough.

Figure 3:
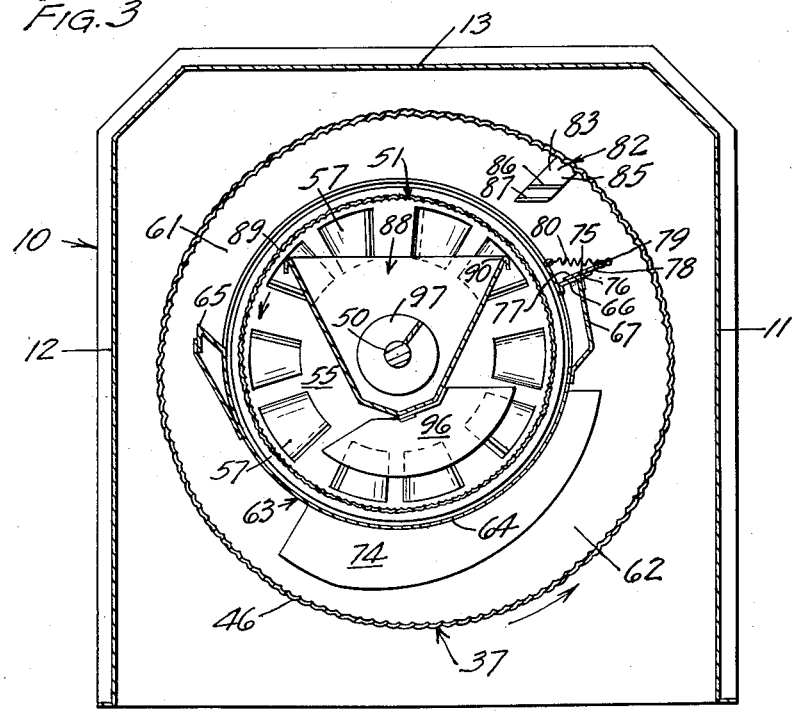
Figure 3 is a vertical cross section of my apparatus, taken on the line 3—3 of Figure 1, the outer trough being in normal grain-receiving position.

With continued reference to the drawings, and particularly to Figure 1, I there show a double cylinder, double trough-type of separator in which my special outer trough construction has been incorporated. The entire separator is shown somewhat diagrammatically since the mechanical construction and operation of this type of equipment is well known. Generally speaking, the separator comprises a housing 10 which also provides a framing member and support for various mechanical and fixed elements enclosed therewithin. Housing 10, as shown in Figures 1, 2 and 3, comprises a pair of side walls 11 and 12, and a top wall 13. Housing 10 also has an end wall 14 at the feed end of the separator and another end wall 15 at the discharge end thereof. End wall 15 is preferably stepped to form an annular inwardly spaced portion 16 connected by a generally cylindrical hood 17 so as to more efficiently house and support bearing members. Another short cylindrical hood 18 is secured circumferentially around the annular plate 16 and rigidly connects with flange plate 19, in turn rigidly secured as by bolting to the longitudinal walls 11, 12 and 13. It will be noted that the members 15 through 19 form a series of annular steps which facilitate the mounting and separating of grain during operation. The flange 16 terminates inwardly in a bearing edge 20 for a purpose to be subsequently described. Hood 17 has an opening 21 and bears a worm drive 22, a portion of which extends into the opening 21 and the function of which will be subsequently described. Another manually operated worm drive 23 is mounted forwardly of end plate 15 in a hooded opening 24 formed at the upper side of a bearing structure 25.

The feed end of the housing 10 has a flanged collar 26 which may be secured as by bolts 27 to the end wall 14, as shown. Flanged collar 26 provides a horizontal opening 28 which communicates from the exterior of housing 10 to the interior thereof. A feed spout 29 is secured to the end wall 14 and has an inclined surface 30 which extends downwardly through the opening 28 and terminates in edge 30a within the housing 10. A housing extension 31 is secured to end wall 14 and has a vertical wall 32 which supports a main bearing 33, as shown in Figure 1.

Discharge spouts at the discharge end of the separator are provided for the different grain and waste fractions. Spout 34 communicates through the bottom of hooded portion 18 to receive oversized waste in grain separation. Spout 35 communicates through the bottom of stepped cylindrical portion 17 and is adapted to receive properly graded product from the inner cylinder. Discharge spout 36 is formed at the underside of bearing box 25 and is adapted to receive undersized particles and wheat seeds from the inner trough.

The outer cylinder is designated generally at 37 and is rotatably disposed in a general horizontal direction within the housing 10. An annular flange 38 is secured to the outer cylinder 37 at the feed end of the device and a support sleeve 39 is axially secured to flange 38. Support sleeve 39 presents a large opening 40 which surrounds the inwardly extending portion 41 of the collar 26. Support sleeve 39 has the ring sprocket 42 which is adapted to rotate the cylinder 37 through conventional drive means, not shown. Support sleeve 39 also has an external groove 43 which is adapted to receive and be supported by trunnions 44. The trunnions 44, in turn, are rotatably mounted in fixed axis with respect to the frame and housing member 10. The inside of the outer cylinder 37 is provided with a multiplicity of pockets or indents 45 which pick up grain and smaller particles at the inner surface of the cylinder during rotation while permitting the larger particles to remain at the bottom of the cylinder. The pockets or indents 45 are disposed over the entire inner surface of the cylindrical shell 46, the latter terminating at the discharge end in a support collar 47 of substantially the same internal diameter as the cylindrical shell 46. Discharge edge 48 of the cylinder 37 overlies the spout 34, as shown. Support collar 47 may be supported rotatably upon trunnions 49 during operation of the separator.

Shaft 50 is journaled across the entire housing 10 in bearing box 25 at the discharge end and in bearing 33 at the inlet end. By reference to Figures 3 and 4, it may be observed that the shaft 50 is eccentrically located with respect to the outer cylinder 37. As previously pointed out in this specification, the eccentricity is necessary in order to obtain economical capacity of the machine in operation in view of the tendency of the grain to build up along the lower leading edge of the outer cylinder during rotation. The inner cylinder is indicated generally at 51, as shown in Figs. 1, 2 and 3, and is of smaller diameter than outer cylinder 37. The inner cylinder 51 has a longitudinal shell 52, the inner surface of which is provided with indents or pockets 53 of smaller size than the indents or pockets 45 disposed on the inner surfaces of the outer cylinder 37. The shell 52 of the inner cylinder 51 has a continuous auger-type conveyor 54 which, during rotation of the inner cylinder 51, tends to work the grain picked up by the outer cylinder back to the inlet end of the apparatus. The inlet end of the inner cylinder 51 is in the nature of a spider 55 having a central hub 56 which is, in turn, secured to the main shaft 50. Vanes or scoops 55a extend across the spider 55 and are utilized to pick up grain and spill it into the inside of the inner cylinder 51. The discharge end of the inner cylinder 51 terminates in an opening 57 around which is formed a support collar 58, the support collar 58 being trunnioned on supporting wheels 59 which, in turn, are journaled on fixed axis to the frame and housing 10. The support collar 58 also has a discharge lip 60 which overlies spout 35 for discharge of the desired fraction of grain.

Since the inner cylinder 51 is secured to the main shaft 50, it is necessarily concentric therewith. However, since the main shaft 50 is journaled eccentrically with respect to the outer cylinder 37, an area 61 will provide close clearance between the inner and outer cylinders. Since the direction of rotation of the outer cylinder 37 in Figure 3 is counterclockwise, the grain contained therein will tend to pile up at the bottom and slightly to the right of the main shaft 50. The greatest clearance at area 62 is, therefore, provided to get maximum capacity during operation of the separator.

Figure 4:
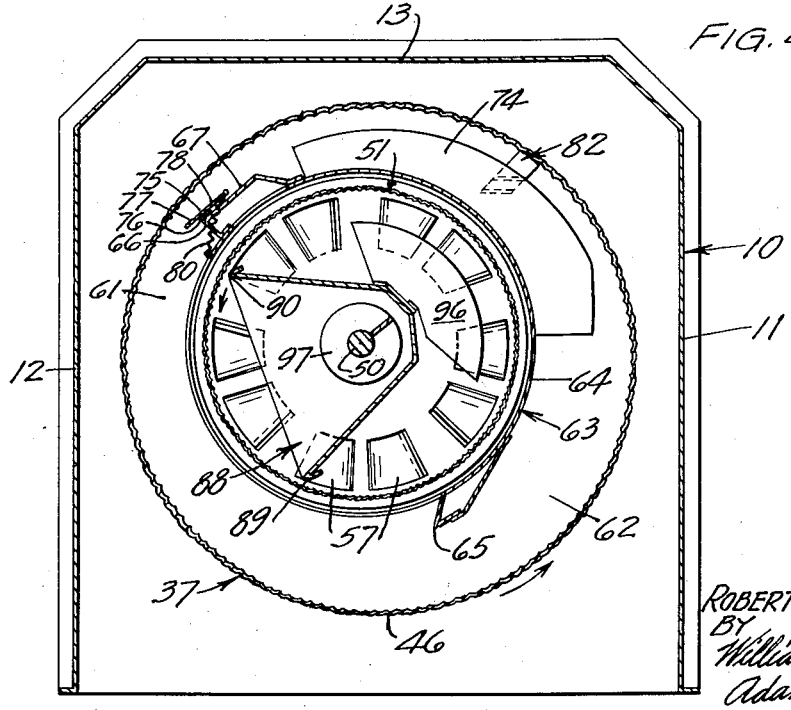
Figure 4 is taken on the same section as Figure 3, and shows the outer trough inverted to dumping position.

The means for collecting grain which is received and held by the indents or pockets 45 is called the "outer trough" and, as indicated generally at 63, as shown in Figures 1, 3 and 4 in relation to the other parts of the machine and as shown separately in Figure 2. The outer trough 63 is in the form of substantially the longitudinal half of a whole cylinder. The main trough body is indicated at 64 and has a pair of substantially horizontal side edges, one of the side edges 65 providing a dump and the other horizontal edge 66 providing a receiving lip. A portion of trough 64 immediately adjacent the receiving lip 66 is preferably formed in an outwardly flaring pocket 67 which provides additional relief for grain which has been caught within the outer trough. The outer trough 63 constitutes an important part of my invention and is mounted so as to be capable of complete inversion in contradistinction to prior art outer troughs which were necessarily fixed or adjustable through but a very limited arc. The rotating mounting is accomplished through a circular end plate 68 having an axial bearing 69 which is freely rotatable upon the main shaft 50, as shown in Figure 1. The circular end plate is joined in tight relation with the trough body 64 so as not to permit any grain to spill out of the trough as it works up toward the inlet end of the apparatus. The other end of the outer trough is provided with a complete circular ring 70 which is concentric with the axis of the trough and is provided with a groove 71 which is adapted to receive the inner edge 20 of flange 16 and provide a tight bearing connection therewith. Extending edgewise of at least a portion of the ring 70 is a rack 72 having teeth 73 which are engageable with the worm drive 22, as shown in Figure 1. Since the conveyor 54 on the outside of the inner trough 51 constantly urges grain caught in outer trough 63 toward the closed end plate 68 adjacent the inlet end of the apparatus, there is no need for providing special closure at the ring end 70.

Externally of the trough body 64 are disposed a series of vanes 74 which are angulated, as shown in Figures 1 and 2, so as to cause grain fed into the inlet end of the outer cylinder 37 to progress along the bottom of the cylinder as it rotates and thereby distributing the grain along the entire inner surface of the shell 46 and subjecting it to the pockets or indents 45. The vanes 74 also cause the oversized particles to continue to progress to the discharge lip 48 on outer cylinder 37 from whence such oversized particles are discharged into spout 34, as previously noted.

Referring now particularly to Figures 3, 4 and 5, the receiving lip 66 which forms one horizontal edge of the trough body 64 is so constructed as not to extend outwardly beyond the minimum clearance at area 61 between the outer and inner cylinders. It is, however, essential to accurate grading that a grading or dividing means be provided which will extend outwardly of the receiving lip 66 and be closer to the inner area of shell 46 during operation of the apparatus. Such grading or dividing means would not lie at a safe minimum clearance at area 61 under normal circumstances and, in fact, would strike the shell at this area. I therefore provide a special pivoted grading plate 75 which lies horizontally over the receiving lip 66 and is pivoted longitudinally at 76 adjacent the outer corner of receiving lip 66. In its normal operating position, shown in Figure 3, the plate 75 has an inner margin 77 which overlies receiving lip 66 and an outer margin 78 which extends beyond the receiving lip 66 and in closer relationship with the inner surface of shell 46. Referring now to Figure 5, the grading plate 75 has an outwardly extending pin 79 secured endwise and adapted to extend outwardly toward the inner surface of the annular flange 16 at the discharge end of the apparatus. Pin 79 will also lie quite close to the hooded member 18, as shown.

A tension spring 80 is secured at one end to pin 79 and at its other end to an anchor 81, the latter being rigidly secured to the ring 70 of trough 63. The location of pin 79, anchor 81 and pivot axis 76 is such that an over-center relationship exists between pins 79 and anchor 81 and the grading plate 75 will, therefore, be biased to either an outwardly extended position, as shown in Figure 3, or a retracted position as shown in Figure 4. Forming cam means cooperatively with pin 79 is a camming member indicated generally at 82. This camming member has an L-shaped bracket 83 with a flange 84 adapted to be secured to the underside of hood 18. Depending portion 85 has formed thereon a pair of substantially parallel plates 86 and 87 extending inwardly and in the projected pathway of the pin 79. The relative positions of the cam member 82 and the grading plate in separating and dumping positions, respectively, are shown in Figures 3 and 4. Figure 5 illustrates the relative positions of the pin 79 and the cam member 82 when the grading blade 75 is being pivoted from one position to the other.

Referring to Figures 1, 3 and 4, an inner trough structure indicated generally at 88 has a pair of substantially horizontal edges 89 and 90, as shown. The inner trough structure also has an end plate 91 which bears a journal 92, in turn, freely rotatable on the main shaft 50. The discharge end of the inner trough 88 terminates in a lip 93 which overlies the spout 36. Adjacent the lip 93 the inner trough 88 is formed cylindrically so as to be received at 94 within a circular opening defined by bearing edge 95 and formed through end plate 15. The lip 93 extends outwardly of the plate 15 and has an outwardly extending rack 95a formed along a substantial distance thereof. The rack 95a, in turn, is engageable with the manual worm drive 23 so that the inner trough 88 may be inverted to dump its contents into the inner cylinder 51 at the end of a production run. The underside of trough 88 is provided with angulated vanes 96 which tend to distribute and advance the cleaned product within the inner cylinder 51 toward the discharge spout 35. When the inner trough is in its normal operating position, the undersized waste material which has collected within the inner trough 88 is advanced toward the discharge spout 36 by means of the screw conveying flight 97 which is secured to the shaft 50 intermediate its ends. Drive means such as the sprocket 98 and chain 99 may be employed to continuously rotate shaft 50 during operation of the apparatus.

*Operation*

In the use and operation of my improved grain cleaner bearing a rotatable outer trough, uncleaned grain material is introduced at the inlet spout 29. The grain falls to the bottom of outer cylinder 37 which rotates in a counterclockwise direction as viewed in Figures 3 and 4. The vanes 74 cause the uncleaned grain to be distributed over the inner surface thereof and particles which are of a proper size will be picked up by the indents or pockets 45. It is understood, of course, that the outer trough is maintained stationary during the grading operation. It is understood that grading plate 75 can be adjusted upwardly or downwardly with the outer trough and in its extended position so as to effect the separating characteristics of the machine. The grain which is not picked up by indents or pockets 45 is discharged as waste material through the discharge spout 34. That material which is picked up by the pockets or indents 45 is carried upwardly to a point where it will drop free therefrom and either fall below or over the grading plate 75 in its operating position, as shown in Figure 3. The material which is not picked up by the rotating outer cylinder will tend to accumulate somewhat at a lower and off-set position with respect to shaft 50 and in the direction of rotation of the outer trough. This, of course, is the area of greatest clearance indicated at 62. Plates 74 will permit a portion of the continuously agitated grain to advance in the area 62 and to be continuously turned over until all of the properly sized particles have been picked up and delivered to the outer trough. Conveyor 54 at the outside of the inner cylinder 51 will cause the grain within the outer trough 63 to be advanced toward the inlet end of the apparatus where it is picked up by the scoops or blades 55a and placed internally of the inner cylinder. The grading process is again repeated, this time with the particles subjected to the pockets or indents 53 and being advanced along the shell 52 of the inner cylinder 51 by means of the angulated blades 96 secured below the inner trough 88. The cleaned product will be discharged from spout 35 and undersized particles will be elevated and discharged into the inner trough. Screw conveyor 97 will continuously remove the undersized particles through spout 36. Because the inner trough 88 is mounted concentrically with the inner cylinder 51, no difficulty is encountered when it is desired to dump the contents thereof at the end of a run. Similarly, my special outer trough construction permits complete dumping of the contents thereof by manually rotating the worm drive 22 to invert the entire outer trough on the same axis 50. During the inversion of the outer trough 63, it is caused to rotate in a counterclockwise direction, as viewed in Figures 3 and 4. It wlil be noted that the enlarged width of the vanes 74 will maintain clearance through the space at area 62 between the inner and outer cylinders, all through the inversion of the trough. The dumping lip 65 is not required to extend outwardly for any great distance and, hence, no difficulty is encountered in maintaining clearance with this member. In the case of the grading blade 75, however, the extending pin 79 moves in an arcuate pathway, the locus of which is intercepted by the rigid cam member 82. The pin strikes the upper cam plate 86 as the trough is moved from its operating position in Figure 3 to the dumping position in Figure 4. The grading plate 75 then passes through the position shown in Figure 5 and the spring 80, after over-center position is attained, will cause the plate 75 to snap into the retracted position shown in Figure 4. Continued rotation of the outer trough will permit complete dumping of the contents and, at no time, do the parts of the trough come into contact with either the inner cylinder 51, or the outer cylinder 37. In the retracted position shown in Figure 4, the grading plate 75 and the outwardly projecting pin 79 now lie in a new locus, the pathway of which will be intercepted by the cam plate 87 on rotation in a clockwise direction. Here, again, the plate is caused to pivot during its travel through the camming member and as it is moved to its extended position, the pin 79 will pass through the over-center relation and spring 80 will snap the grading plate to its outer position, as shown in Figure 3. The conditioning of the outer trough is completely automatic and prevents any jamming or destruction of machine parts which would necessarily occur if the grading plate were fixed in its operating position or which might occur if manual retraction of the plate were relied upon solely.

It may thus be seen that I have provided a novel outer trough structure which permits easy cleaning from a position externally of the housing, retracting and extending portions of the trough to compensate for the eccentric clearances between inner and outer cylinders of apparatus of the class described, and by automatic means, preventing possible internal breakage of equipment through human error.

What is claimed is:

1. In a grain separator of the double cylinder double trough type having an outer rotatable cylinder and an inner cylinder rotatably mounted in spaced clearance therein on an eccentric axis parallel to and above the axis of the outer rotatable cylinder, an outer trough therefor mounted in spaced clearance between the inner and outer cylinders and normally underlying said inner cylinder, means adapted to rotatably invert and right said outer trough, said outer trough having a pair of substantially horizontal side edges, one of said side edges providing a receiving lip, a grading plate positioned along said receiving lip and pivotally mounted in unbalanced manner with respect thereto, means biasing said plate to outwardly extended position and to retracted position with respect to the receiving lip, said grading plate in operation being pivoted to an outwardly extended position closely adjacent the inner surface of the outer cylinder to receive grain dropped therefrom, and cam means engageable with said plate for pivotal movement thereof to a retracted position for restricted clearance with the inner and outer cylinders at an upper position when the outer trough is inverted.

2. In a grain separator of the double cylinder double trough type having an outer rotatable cylinder and an inner cylinder rotatably mounted in spaced clearance therein on an eccentric axis paralel to and above the axis of the outer rotatable cylinder, an outer trough therefor mounted in spaced clearance between the inner and outer cylinders and normally underlying said inner cylinder, means adapted to rotatably invert and right said outer trough, said outer trough having a pair of substantially horizontal side edges, one of said side edges providing a dump and the other a receiving lip, a grading plate positioned along said receiving lip and pivotally mounted in unbalanced manner with respect thereto, means biasing said plate to outwardly extended position and to retracted position with respect to the receiving lip, said grading plate in operation being pivoted to an outwardly extended position closely adjacent the inner surface of the outer cylinder to receive grain dropped therefrom, and cam means engageable with said plate for pivotal movement thereof to a retracted position for restricted clearance with the inner and outer cylinders at an upper position when the outer trough is arcuately turned and said dumping edge is moved to a lower position.

3. A double cylinder grain separator comprising an outer cylinder rotatable on a substantially horizontal axis, an inner cylinder rotatably mounted in spaced clearance therewithin on an eccentric axis parallel to and above the horizontal axis of the outer rotatable cylinder, a housing structure surrounding said cylinders, an inner trough mounted on an axis substantially coincident with that of the inner cylinder and capable of inversion therewithin, an outer trough mounted in spaced clearance between the inner and outer cylinders and normally underlying said inner cylinder, means adapted to rotatably invert and right said outer trough, said outer trough having a pair of substantially horizontal side edges, one of which provides a receiving lip, a grading plate pivotally mounted in unbalanced manner adjacent the receiving lip on an axis substantially parallel to that of the inner cylinder and means biasing said plate in a normal outwardly extended position closely adjacent the inner surface of the outer cylinder to receive grain dropped therefrom and to a retracted position, a camming member mounted endwise on said grading plate, and a cooperating camming member mounted on said housing in the projected pathway of said outer trough when turned to inverted position for dumping whereby to retract said grading plate to maintain clearance between said cylinders at a more restricted upper position.

4. A double cylinder grain separator comprising a housing, an outer cylinder mounted within the housing on a substantially horizontal axis, an inner cylinder mounted in spaced clearance within the outer cylinder on an eccentric substantially horizontal axis providing greater clearance at the leading side of the outer cylinder in its rotation than at the following side, an outer trough mounted in spaced clearance between the inner and outer cylinders and normally underlying said inner cylinder, means adapted to rotatably invert and right said outer trough, said outer trough having a pair of substantially horizontal side edges, a grading plate positioned horizontally along the side edge of said trough lying nearest the leading side of the outer cylinder in its rotation, said grading plate being pivotally mounted in unbalanced manner and pivotal to an outwardly extended position closely adjacent the inner surface of the outer cylinder and retractable from its extended position, over-center biasing means urging said grading plate to each of its extended and retracted positions, and cam means mounted with respect to said housing and engagable with said grading plate to move the grading plate to retracted position when raised during inversion of the outer trough and for extending the grading plate during lowering thereof whereby to automatically maintain safe clearance at all times between the outer trough and both of said cylinders.

5. A dumping trough for mounting between inner and outer grain separating cylinders wherein the inner cylinder is eccentrically mounted with respect to the outer in horizontal relation so as to produce a greater clearance toward the bottom and leading side of the outer cylinder in its rotation than at the diametrically opposed position, said dumping trough comprising a continuous curved sheet having a pair of horizontal side edges and mounted for rotation from a position underlying said inner cylinder to a position overlying the same, means adapted to rotatably invert and right said outer trough, angulated vanes secured to the underside of said dumping trough and disposed therebelow when the dumping trough is in its normal receiving position, a grading plate pivotally mounted in unbalanced manner edgewise of said dumping trough and normally extending outward into close clearance with the inner surface of the outer cylinder to receive grain dropped therefrom during rotation thereof, means biasing said plate to outwardly extended and to retracted positions, and cam means engageable with said grading plate to retract the same upon inversion of said dumping trough, both said retracted grading plate and said depending vanes maintaining clearance between the inner and outer cylinders when the trough is in inverted dumping position.

6. In a grain separator having a housing, an outer rotatable cylinder, and an inner cylinder rotatably mounted in spaced clearance therein on an eccentric axis parallel to and above the axis of the outer rotatable cylinder, an outer trough therefor rotatably mounted horizontally in spaced clearance between the inner and outer cylinders and normally underlying said inner cylinder, said outer trough having a pair of substantially horizontal side edges, a grading plate pivotally mounted in unbalanced manner along one of said side edges and movable from an extended position closely adjacent the inner surface of the outer cylinder to a retracted position in restricted clearance with the inner cylinder, means biasing said plate to each of said extended and retracted positions, cam means engageable with said grading plate to move the same to extended and to retracted positions, and means mounted externally of said housing and extending inwardly into driving engagement with the outer trough for inverting the same and causing said grading plate to maintain clearance between said inner and outer eccentric cylinders by pivotal movement of said plate from extended to retracted position during the inversion of said trough.

7. In a grain separator having a housing, an outer rotatable cylinder, and an inner cylinder rotatably mounted in spaced clearance therein on an eccentric axis parallel to and above the axis of the outer rotatable cylinder, an outer trough therefor rotatably mounted horizontally in spaced clearance between the inner and outer cylinders and normally underlying said inner cylinder, said outer trough having a pair of substantially horizontal side edges, a grading plate pivotally mounted along one of said side edges and movable from an extended position closely adjacent the inner surface of the outer cylinder to a retracted position in restricted clearance with the inner cylinder, means responsive to rotating inversion of said outer trough adapted to move said grading plate from its extended position to its retracted position, and means in driving engagement with said outer trough for rotating the same and causing said first mentioned means to actuate said grading plate.

References Cited in the file of this patent

UNITED STATES PATENTS

| | | |
|---|---|---|
| 1,912,375 | Johnson | June 6, 1933 |
| 2,135,343 | Johnson | Nov. 1, 1938 |